(12) United States Patent
Miller et al.

(10) Patent No.: US 10,556,227 B2
(45) Date of Patent: *Feb. 11, 2020

(54) CRYSTALLINE AMMONIA TRANSITION METAL MOLYBDOTUNGSTATE

(71) Applicant: UOP LLC, Des Plaines, IL (US)

(72) Inventors: Stuart Miller, Arlington Heights, IL (US); Laura Collins, Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/037,667

(22) Filed: Jul. 17, 2018

(65) Prior Publication Data

US 2018/0318809 A1 Nov. 8, 2018

Related U.S. Application Data

(62) Division of application No. 15/377,625, filed on Dec. 13, 2016, now Pat. No. 10,052,616.

(60) Provisional application No. 62/267,871, filed on Dec. 15, 2015.

(51) Int. Cl.

| | | |
|---|---|---|
| B01J 21/10 | (2006.01) |
| B01J 23/16 | (2006.01) |
| B01J 23/72 | (2006.01) |
| B01J 23/74 | (2006.01) |
| B01J 37/04 | (2006.01) |
| B01J 37/08 | (2006.01) |
| C10G 45/08 | (2006.01) |
| C10G 45/50 | (2006.01) |
| C10G 47/04 | (2006.01) |
| B01J 27/24 | (2006.01) |
| C10G 45/60 | (2006.01) |
| B01J 37/20 | (2006.01) |
| B01J 37/00 | (2006.01) |
| B01J 37/03 | (2006.01) |
| B01J 23/30 | (2006.01) |
| B01J 23/34 | (2006.01) |
| B01J 23/888 | (2006.01) |
| B01J 35/00 | (2006.01) |

(52) U.S. Cl.
CPC .............. *B01J 27/24* (2013.01); *B01J 23/30* (2013.01); *B01J 23/34* (2013.01); *B01J 23/8885* (2013.01); *B01J 35/002* (2013.01); *B01J 37/0009* (2013.01); *B01J 37/0009* (2013.01); *B01J 37/031* (2013.01); *B01J 37/20* (2013.01); *C10G 45/08* (2013.01); *C10G 45/50* (2013.01); *C10G 45/60* (2013.01); *C10G 47/04* (2013.01); *B01J 2523/00* (2013.01); *C10G 2300/202* (2013.01); *C10G 2300/205* (2013.01)

(58) Field of Classification Search
CPC ... B01J 21/10; B01J 23/16; B01J 23/72; B01J 23/74; B01J 23/76; B01J 31/0201; B01J 37/0009; B01J 37/009; B01J 37/04; B01J 37/08; C10G 37/20; C10G 45/08; C10G 45/50; C10G 47/04
See application file for complete search history.

(56) References Cited

U.S. PATENT DOCUMENTS 6,712,955 B1 * 3/2004 Hou ............... B01J 23/002 208/108
10,052,616 B2 * 8/2018 Miller ............... B01J 27/24

* cited by examiner

*Primary Examiner* — Randy Boyer

(57) ABSTRACT

A hydroprocessing catalyst or catalyst precursor has been developed. The catalyst is a unique crystalline ammonia transition metal molybdotungstate material. The hydroprocessing using the crystalline ammonia transition metal molybdotungstate material or a decomposition product thereof may include hydrodenitrification, hydrodesulfurization, hydrodemetallation, hydrodesilication, hydrodearomatization, hydroisomerization, hydrotreating, hydrofining, and hydrocracking.

14 Claims, 1 Drawing Sheet

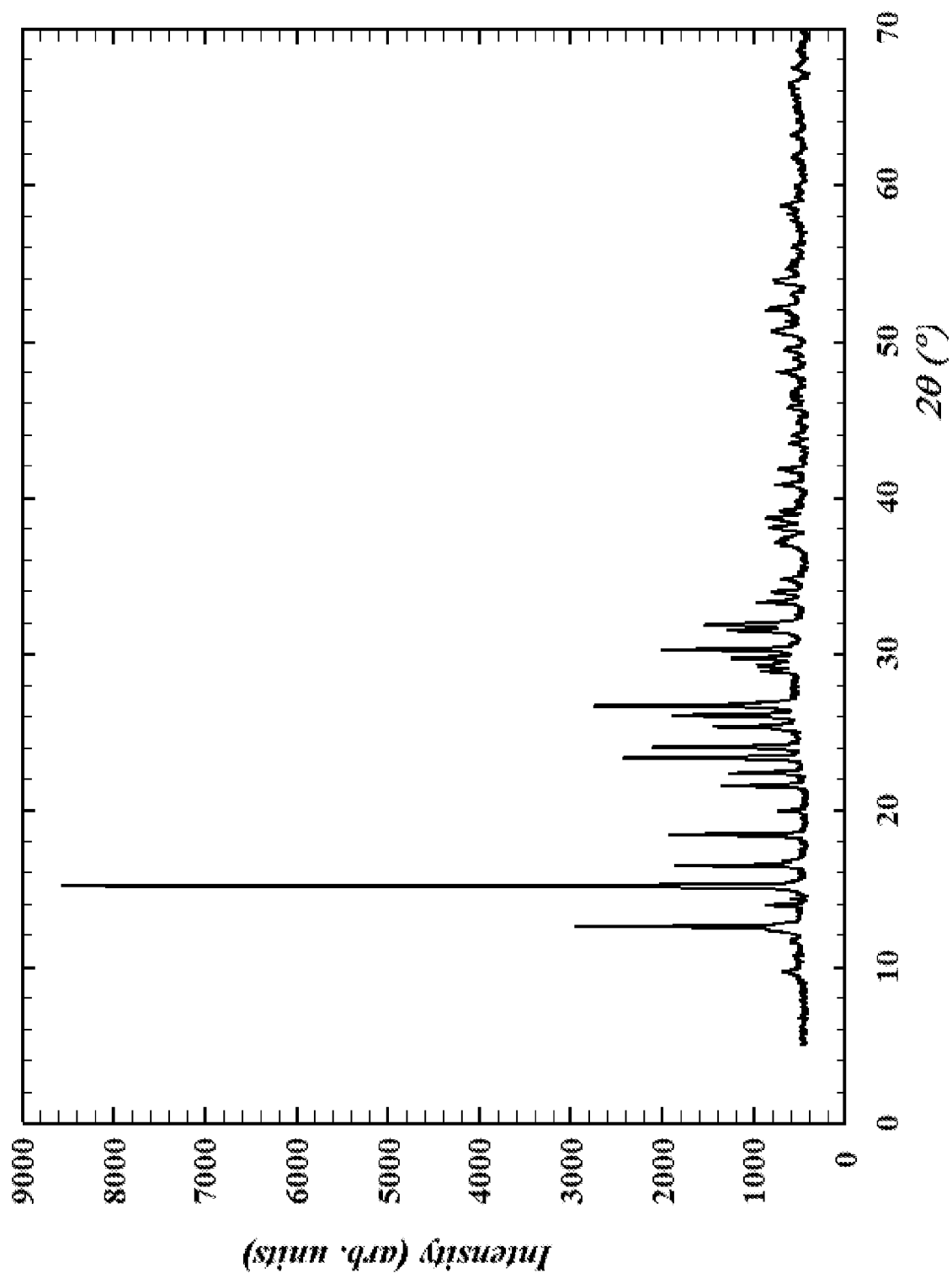

US 10,556,227 B2

CRYSTALLINE AMMONIA TRANSITION METAL MOLYBDOTUNGSTATE

CROSS-REFERENCE TO RELATED APPLICATIONS

This application is a Division of application Ser. No. 15/377,625 filed Dec. 13, 2016, which application claims priority from Provisional Application No. 62/267,871 filed Dec. 15, 2015, the contents of which cited applications are hereby incorporated by reference.

FIELD OF THE INVENTION

This invention relates to a new hydroprocessing catalyst. More particularly this invention relates to a unique crystalline ammonia transition metal molybdotungstate material and its use as a hydroprocessing catalyst. The hydroprocessing may include hydrodenitrification, hydrodesulfurization, hydrodemetallation, hydrodesilication, hydrodearomatization, hydroisomerization, hydrotreating, hydrofining, and hydrocracking.

BACKGROUND

In order to meet the growing demand for petroleum products there is greater utilization of sour crudes, which when combined with tighter environmental legislation regarding the concentration of nitrogen and sulfur within fuel, leads to accentuated refining problems. The removal of sulfur (hydrodesulfurization—HDS) and nitrogen (hydrodenitrification—HDN) containing compounds from fuel feed stocks is targeted during the hydrotreating steps of refining and is achieved by the conversion of organic nitrogen and sulfur to ammonia and hydrogen sulfide respectively.

Since the late 1940s the use of catalysts containing nickel (Ni) and molybdenum (Mo) or tungsten (W) have demonstrated up to 80% sulfur removal. See for example, V. N. Ipatieff, G. S. Monroe, R. E. Schaad, Division of Petroleum Chemistry, 115$^{th}$ Meeting ACS, San Francisco, 1949. For several decades now there has been an intense interest directed towards the development of materials to catalyze the deep desulfurization, in order to reduce the sulfur concentration to the ppm level. Some recent breakthroughs have focused on the development and application of more active and stable catalysts targeting the production of feeds for ultra low sulfur fuels. Several studies have demonstrated improved HDS and HDN activities through elimination of the support such as, for example, $Al_2O_3$. Using bulk unsupported materials provides a route to increase the active phase loading in the reactor as well as providing alternative chemistry to target these catalysts.

More recent research in this area has focused on the ultra deep desulfurization properties achieved by a Ni—Mo/W unsupported 'trimetallic' material reported in, for example, U.S. Pat. No. 6,156,695. The controlled synthesis of a broadly amorphous mixed metal oxide consisting of molybdenum, tungsten and nickel, significantly outperformed conventional hydrotreating catalysts. The structural chemistry of the tri-metallic mixed metal oxide material was likened to the hydrotalcite family of materials, referring to literature articles detailing the synthesis and characterization of a layered nickel molybdate material, stating that the partial substitution of molybdenum with tungsten leads to the production of a broadly amorphous phase which, upon decomposition by sulfidation, gives rise to superior hydrotreating activities.

The chemistry of these layered hydrotalcite-like materials was first reported by H. Pezerat, contribution à l'étude des molybdates hydrates de zinc, cobalt et nickel, C. R. Acad. Sci., 261, 5490, who identified a series of phases having ideal formulas $MMoO_4.H_2O$, $EHM_2O^-$ $(MoO_4)_2.H_2O$, and $E_{2-x}(H_3O)_xM_2O(MoO_4)_2$ where E can be $NH_4^+$, $Na^+$ or $K^+$ and M can be $Zn^{2+}$, $Co^{2+}$ or $Ni^{2+}$.

Pezerat assigned the different phases he observed as being Φc, Φy or Φy and determined the crystal structures for Φx and Φy, however owing to a combination of the small crystallite size, limited crystallographic capabilities and complex nature of the material, there were doubts raised as to the quality of the structural assessment of the materials. During the mid 1970s, Clearfield et al attempted a more detailed analysis of the Φx and Φy phases, see examples A. Clearfield, M. J. Sims, R. Gopal, Inorg. Chem., 15, 335; A. Clearfield, R. Gopal, C. H. Saldarriaga-Molina, Inorg. Chem., 16, 628. Single crystal studies on the product from a hydrothermal approach allowed confirmation of the Φx structure, however they failed in their attempts to synthesize Φy and instead synthesized an alternative phase, Na—Cu $(OH)(MoO_4)$, see A. Clearfield, A. Moini, P. R. Rudolf, Inorg. Chem., 24, 4606.

The structure of Φy was not confirmed until 1996 when by Ying et al. Their investigation into a room temperature chimie douce synthesis technique in the pursuit of a layered ammonium zinc molybdate led to a metastable aluminum-substituted zincite phase, prepared by the calcination of Zn/Al layered double hydroxide $(Zn_4Al_2(OH)_{12}CO_3.zH_2O)$. See example D. Levin, S. L. Soled, J. Y. Ying, Inorg. Chem., 1996, 35, 4191-4197. This material was reacted with a solution of ammonium heptamolybdate at room temperature to produce a highly crystalline compound, the structure of which could not be determined through conventional ab-initio methods. The material was indexed, yielding crystallographic parameters which were the same as that of an ammonium nickel molybdate, reported by Astier, see example M. P. Astier, G. Dji, S. Teichner, J. Ann. Chim. (Paris), 1987, 12, 337, a material belonging to a family of ammonium-amine-nickel-molybdenum oxides closely related to Pezerat's materials. Astier did not publish any detailed structural data on this family of materials, leading to Ying et al reproducing the material to be analyzed by high resolution powder diffraction in order to elucidate the structure. Ying et al named this class of materials 'layered transition-metal molybdates' or LTMs.

SUMMARY OF THE INVENTION

A unique crystalline ammonia transition metal molybdotungstate material has been produced and optionally sulfided, to yield an active hydroprocessing catalyst. The material has the designation UPM-11. The crystalline ammonia transition metal molybdotungstate material has a unique x-ray powder diffraction pattern showing strong peaks at 6.99, 5.81, 5.36, and 4.79 Å. The crystalline ammonia transition metal molybdotungstate material has the formula:

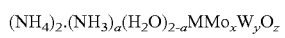

where 'M' is a metal selected from Mg, Mn, Fe, Co Ni, Cu, Zn and mixtures thereof; 'a' varies from 0 to 2; 'x' varies from 1.5 to 3, or from 1.5 to 2.5, or from 1.75 to 2.25; 'y' varies 0.01 to 0.5, or from 0.05 to 0.4, or from 0.1 to 0.3; the sum of (x+y) must be ≤3, or ≤2.5; z is a number which satisfies the sum of the valences of [(M+x+y)+2]; the material having a x-ray powder diffraction pattern showing peaks at the d-spacings listed in Table A:

TABLE A

| d (Å) | $I_0/I$ |
|---|---|
| 6.99 | m |
| 6.30 | w |
| 5.81 | vs |
| 5.36 | m |
| 5.05 | w |
| 4.79 | m |
| 4.43 | w |
| 4.10 | w |
| 3.95 | w |
| 3.79 | m |
| 3.69 | m |
| 3.50 | m |

Another embodiment involves a method of making a crystalline ammonia transition metal molybdotungstate material having the formula:

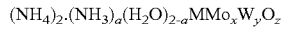

where 'M' is a metal selected from Mg, Mn, Fe, Co Ni, Cu, Zn and mixtures thereof; 'a' varies from 0 to 2; 'x' varies from 1.5 to 3, or from 1.5 to 2.5, or from 1.75 to 2.25; 'y' varies 0.01 to 0.5, or from 0.05 to 0.4, or from 0.1 to 0.3; the sum of (x+y) must be ≤3, or ≤2.5; z is a number which satisfies the sum of the valences of [(M+x+y)+2]; the material having a x-ray powder diffraction pattern showing peaks at the d-spacings listed in Table A:

TABLE A

| d (Å) | $I_0/I$ |
|---|---|
| 6.99 | m |
| 6.30 | w |
| 5.81 | vs |
| 5.36 | m |
| 5.05 | w |
| 4.79 | m |
| 4.43 | w |
| 4.10 | w |
| 3.95 | w |
| 3.79 | m |
| 3.69 | m |
| 3.50 | m |

The method comprising forming a reaction mixture containing $NH_3$, H sources of M, W, and Mo; adjusting the pH of the reaction mixture to a pH of from about 8.5 to about 10; and recovering the crystalline ammonia transition metal molybdotungstate material.

Yet another embodiment involves a conversion process comprising contacting a feed with a catalyst at conversion conditions to give at least one product, the catalyst comprising the decomposition product of the decomposition by sulfidation of a crystalline ammonia transition metal molybdotungstate material having the formula:

where 'M' is a metal selected from Mg, Mn, Fe, Co Ni, Cu, Zn and mixtures thereof; 'a' varies from 0 to 2; 'x' varies from 1.5 to 3, or from 1.5 to 2.5, or from 1.75 to 2.25; 'y' varies 0.01 to 0.5, or from 0.05 to 0.4, or from 0.1 to 0.3; the sum of (x+y) must be ≤3, or ≤2.5; z is a number which satisfies the sum of the valences of [(M+x+y)+2]; the material having a x-ray powder diffraction pattern showing peaks at the d-spacings listed in Table A:

TABLE A

| d (Å) | $I_0/I$ |
|---|---|
| 6.99 | m |
| 6.30 | w |
| 5.81 | vs |
| 5.36 | m |
| 5.05 | w |
| 4.79 | m |
| 4.43 | w |
| 4.10 | w |
| 3.95 | w |
| 3.79 | m |
| 3.69 | m |
| 3.50 | m |

Additional features and advantages of the invention will be apparent from the description of the invention, the drawing and claims provided herein.

BRIEF DESCRIPTION OF THE DRAWING

The FIG. 1s the X-ray powder diffraction pattern of a crystalline ammonia transition metal molybdotungstate prepared as described in Examples 1 to 3.

DETAILED DESCRIPTION OF THE INVENTION

The present invention relates to a crystalline ammonia transition metal molybdotungstate composition, a process for preparing the composition, and a process using the composition as the catalyst. The composition has been designated UPM-11. This composition has an empirical formula:

where 'M' is a metal selected from Mg, Mn, Fe, Co Ni, Cu, Zn and mixtures thereof; 'a' varies from 0 to 2; 'x' varies from 1.5 to 3, or from 1.5 to 2.5, or from 1.75 to 2.25; 'y' varies 0.01 to 0.5, or from 0.05 to 0.4, or from 0.1 to 0.3; the sum of (x+y) must be ≤3, or ≤2.5; z is a number which satisfies the sum of the valences of [(M+x+y)+2].

The crystalline composition of the invention is characterized by having an extended network of M-O-M, where M represents a metal, or combination of metals listed above. The structural units repeat itself into at least two adjacent unit cells without termination of the bonding. The composition can have a one-dimensional network, such as for example, linear chains. Decomposition products from these one-dimensional chains may result in one-dimensional chains or a two dimensional network i.e. layers or a three dimensional framework solid.

The crystalline ammonia transition metal molybdotungstate composition having a unique x-ray powder diffraction pattern showing peaks at the d-spacings listed in Table A.

TABLE A

| d (Å) | $I_0/I$ |
|---|---|
| 6.99 | m |
| 6.30 | w |
| 5.81 | vs |
| 5.36 | m |
| 5.05 | w |
| 4.79 | m |
| 4.43 | w |
| 4.10 | w |
| 3.95 | w |

TABLE A-continued

| d (Å) | I₀/I |
|---|---|
| 3.79 | m |
| 3.69 | m |
| 3.50 | m |

The crystalline ammonia transition metal molybdotungstate composition of the invention having the x-ray powder diffraction pattern shown in the FIGURE.

The crystalline ammonia transition metal molybdotungstate composition is prepared by solvothermal crystallization of a reaction mixture typically prepared by mixing reactive sources of molybdenum with the appropriate metal 'M' with a solvent as well as a source of ammonia. Specific examples of the molybdenum source which may be utilized in this invention include but are not limited to molybdenum trioxide, ammonium molybdotungstate, ammonium thiomolybdate, and ammonium heptamolybdate. Specific examples of the tungsten source which may be utilized in this invention include but are not limited to tungsten trioxide, ammonium ditungstate, ammonium thiotungstate, and ammonium heptatungstate. Sources of other metals "M" include but are not limited to the respective halide, acetate, nitrate, carbonate, thiols and hydroxide salts. Specific examples include nickel chloride, cobalt chloride, nickel bromide, cobalt bromide, magnesium chloride, nickel nitrate, cobalt nitrate, iron nitrate, manganese nitrate, zinc nitrate, nickel acetate, cobalt acetate, iron acetate, nickel carbonate, cobalt carbonate, zinc carbonate, nickel hydroxide and cobalt hydroxide.

The source of ammonia may include but is not limited to ammonium hydroxide, ammonium carbonate, ammonium bicarbonate, ammonium chloride, ammonium fluoride or a combination thereof.

Generally, the solvothermal process used to prepare the composition of this invention involves forming a reaction mixture wherein all of the components, such as for example, Ni, W, Mo, NH₃ and H₂O are mixed in solution together. By way of example, a reaction mixture may be formed which in terms of molar ratios of the oxides is expressed by the formula:

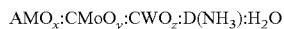

$$AMO_x:CMoO_y:CWO_z:D(NH_3):H_2O$$

where 'M' is selected from the group consisting of iron, cobalt, nickel, manganese, copper, zinc and mixtures thereof; 'A', the molar ratio of M and varies from 0.1 to 1, or from 0.25 to 1, or from 0.5 to 1; 'x' satisfies the valency of M; 'B' represents the molar ratio of Mo and varies from 1 to 3, or from 1.5 to 2.5, or from 1.75 to 2.25; 'y' satisfies the valency of Mo; 'C' represents the molar ratio of W and varies from 0.1 to 1, or from 0.2 to 0.8 or from 0.3 to 0.75; 'z' satisfies the valency of W; varies from 0.1 to 10, or from 0.5 to 7, or from 1 to 5; the molar ratio of H₂O, varies from 0.1 to 100, or from 1 to 30, or from 1 to 10.

It is necessary to adjust the pH of the mixture to a value in the range of about 8.5 to about 10. The pH of the mixture can be controlled through the addition of a base such as NH₄OH, quaternary ammonium hydroxides, amines, and the like.

Once the reaction mixture is formed, the reaction mixture is reacted at temperatures ranging from about 60° C. to about 250° C. for a period of time ranging from 30 minutes to around 14 days. In one embodiment the temperate range for the reaction is from about 70° C. to about 180° C. and in another embodiment the temperature range of from about 80° C. to about 140° C. In one embodiment, the reaction time is from about 1 to about 48 hours, and in another embodiment the reaction time is from about 2 to about 12 hours. The reaction is carried out under atmospheric pressure. In one embodiment the synthesis may be conducted in an open vessel under atmospheric conditions. The crystalline ammonia transition metal molybdotungstate compositions are characterized by their unique x-ray powder diffraction pattern as shown in Table A above and in the FIGURE.

Once formed, the crystalline ammonia transition metal molybdotungstate composition may have a binder incorporated, where the selection of binder includes but is not limited to, anionic and cationic clays such as hydrotalcites, pyroaurite-sjogrenite-hydrotalcites, montmorillonite and related clays, kaolin, sepiolites, silicas, alumina such as (pseudo) boehomite, gibbsite, flash calcined gibbsite, eta-alumina, zicronica, titania, alumina coated titania, silica-alumina, silica coated alumina, alumina coated silicas and mixtures thereof, or other materials generally known as particle binders in order to maintain particle integrity. These binders may be applied with or without peptization. The binder may be added to the bulk crystalline ammonia transition metal molybdotungstate composition, and the amount of binder may range from about 1 to about 30 wt % of the finished catalysts or from about 5 to about 26 wt % of the finished catalyst. The binder may be chemically bound to the crystalline ammonia transition metal molybdotungstate composition, or may be present in a physical mixture with the crystalline ammonia transition metal molybdotungstate composition.

The crystalline ammonia transition metal molybdotungstate composition, with or without an incorporated binder can then be sulfided or pre-sulfided under a variety of sulfidation conditions, these include through contact of the crystalline ammonia transition metal molybdotungstate composition with a sulfur containing feed as well as the use of a gaseous mixture of H₂S/H₂. The sulfidation of the crystalline ammonia transition metal molybdotungstate composition is performed at elevated temperatures, typically ranging from 50 to 600° C., or from 150 to 500° C., or from 250 to 450° C.

The unsupported crystalline ammonia transition metal molybdotungstate material of this invention can be used as a catalyst or catalyst support in various hydrocarbon conversion processes. Hydroprocessing processes is one class of hydrocarbon conversion processes in which the crystalline ammonia transition metal molybdotungstate material is useful as a catalyst. Examples of specific hydroprocessing processes are well known in the art and include hydrodenitrification, hydrodesulfurization, hydrodemetallation, hydrodesilication, hydrodearomatization, hydroisomerization, hydrotreating, hydrofining, and hydrocracking.

The operating conditions of the hydroprocessing processes listed above typically include reaction pressures from about 2.5 MPa to about 17.2 MPa, or in the range of about 5.5 to about 17.2 MPa, with reaction temperatures in the range of about 245° C. to about 440° C., or in the range of about 285° C. to about 425° C. Time with which the feed is in contact with the active catalyst, referred to as liquid hour space velocities (LHSV), should be in the range of about 0.1 h⁻¹ to about 10 h⁻¹, or about 2.0 h⁻ to about 8.0 h⁻. Specific subsets of these ranges may be employed depending upon the feedstock being used. For example when hydrotreating a typical diesel feedstock, operating conditions may include from about 3.5 MPa to about 8.6 MPa, from about 315° C. to about 410° C., from about 0.25/h to about 5/h, and from about 84 Nm3 H2/m3 to about 850 Nm3 H2/m3 feed. Other feedstocks may include gasoline, naphtha, kerosene, gas oils, distillates, and reformate.

Examples are provided below so that the invention may be described more completely. These examples are only by way of illustration and should not be interpreted as a limitation of the broad scope of the invention, which is set forth in the appended claims.

Patterns presented in the following examples were obtained using standard x-ray powder diffraction techniques. The radiation source was a high-intensity, x-ray tube operated at 45 kV and 35 mA. The diffraction pattern from the copper K-alpha radiation was obtained by appropriate computer based techniques. Powder samples were pressed flat into a plate and continuously scanned from 3° and 70° (2θ). Interplanar spacings (d) in Angstrom units were obtained from the position of the diffraction peaks expressed as θ, where θ is the Bragg angle as observed from digitized data. Intensities were determined from the integrated area of diffraction peaks after subtracting background, "$I_0$" being the intensity of the strongest line or peak, and "I" being the intensity of each of the other peaks. As will be understood by those skilled in the art the determination of the parameter 2θ is subject to both human and mechanical error, which in combination can impose an uncertainty of about ±0.4° on each reported value of 2θ. This uncertainty is also translated to the reported values of the d-spacings, which are calculated from the 2θ values. In some of the x-ray patterns reported, the relative intensities of the d-spacings are indicated by the notations vs, s, m, and w, which represent very strong, strong, medium, and weak, respectively. In terms of $100(I/I_0)$, the above designations are defined as:

$w=0-15, m=15-60: s=60-80$ and $vs=80-100$.

In certain instances, the purity of a synthesized product may be assessed with reference to its x-ray powder diffraction pattern. Thus, for example, if a sample is stated to be pure, it is intended only that the x-ray pattern of the sample is free of lines attributable to crystalline impurities, not that there are no amorphous materials present. As will be understood by those skilled in the art, it is possible for different poorly crystalline materials to yield peaks at the same position. If a material is composed of multiple poorly crystalline materials, then the peak positions observed individually for each poorly crystalline materials would be observed in the resulting summed diffraction pattern. Likewise it is possible to have some peaks appear at the same positions within different, single phase, crystalline materials, which may be simply a reflection of a similar distance within the materials and not that the materials possess the same structure.

Example 1

In a 1 ceramic dish, 4.05 g of basic nickel carbonate hydrate (0.04 moles Ni), 14.12 g of ammonium heptamolybdate (0.08 moles Mo) and 1.32 g of sodium tungstate (0.004 moles of W) were added to 3 ml of water forming a concentrated solution of reactants. To this concentrated solution of reactants, 11.53 g of ammonium carbonate (0.24 moles $NH_4$) was added and then mixed by hand for 5 minutes to yield a homogenous mixture of reactants, which was then heated at 150° C. and mixed every hour for 6 hours before being left at 150° C. for 18 hours. The resulting product was analyzed by x-ray powder diffraction, and the x-ray powder diffraction pattern is shown in the FIGURE.

Example 2

In a ceramic dish, 10.14 g of basic nickel carbonate hydrate (0.1 moles Ni), 25.9 g of molybdic acid (0.16 moles Mo) and 10.2 g of sodium tungstate (0.04 moles of W) were added to 7 ml of water forming a concentrated solution of reactants. To this concentrated solution of reactants, 24.02 g of ammonium carbonate (0.5 moles $NH_4$) was added and then mixed by hand for 5 minutes to yield a homogenous mixture of reactants, which was then heated at 150° C. and mixed every hour for 6 hours before being left at 150° C. for 18 hours. The resulting product was analyzed by X-ray powder diffraction, and the X-ray powder diffraction pattern is shown in the FIGURE.

Example 3

In a ceramic dish, 10.14 g of basic nickel carbonate hydrate (0.1 moles Ni), 24.3 g of molybdic acid (0.15 moles Mo) and 12.5 g of sodium tungstate (0.05 moles of W) were added to 7 ml of water forming a concentrated solution of reactants. To this concentrated solution of reactants, 24.02 g of ammonium carbonate (0.5 moles $NH_4$) was added and then mixed by hand for 5 minutes to yield a homogenous mixture of reactants, which was then heated at 150° C. and mixed every hour for 6 hours before being left at 150° C. for 18 hours. The resulting product was analyzed by X-ray powder diffraction, and the X-ray powder diffraction pattern is shown in the FIGURE.

Embodiments

Embodiment 1 is a crystalline ammonia transition metal molybdotungstate material having the formula:

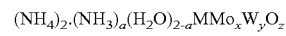

$(NH_4)_2 \cdot (NH_3)_a (H_2O)_{2-a} MMo_x W_y O_z$ where 'M' is a metal selected from Mg, Mn, Fe, Co Ni, Cu, Zn and mixtures thereof; 'a' varies from 0 to 2; 'x' varies from 1.5 to 3, or from 1.5 to 2.5, or from 1.75 to 2.25; 'y' varies 0.01 to 0.5, or from 0.05 to 0.4, or from 0.1 to 0.3; the sum of (x+y) must be ≤3, or ≤2.5; z is a number which satisfies the sum of the valences of [(M+x+y)+2]; the material having a x-ray powder diffraction pattern showing peaks at the d-spacings listed in Table A:

TABLE A

| d (Å) | $I_0/I$ |
| --- | --- |
| 6.99 | m |
| 6.30 | w |
| 5.81 | vs |
| 5.36 | m |
| 5.05 | w |
| 4.79 | m |
| 4.43 | w |
| 4.10 | w |
| 3.95 | w |
| 3.79 | m |
| 3.69 | m |
| 3.50 | m |

The crystalline ammonia transition metal molybdotungstate material of embodiment 1 wherein the crystalline ammonia transition metal molybdotungstate material is present in a mixture with at least one binder and wherein the mixture comprises up to 25 wt % binder. The crystalline ammonia transition metal molybdotungstate material of embodiment 2 wherein the crystalline ammonia transition metal molybdotungstate material is present in a mixture with at least one binder and wherein the mixture comprises up to 25 wt % binder and wherein the binder is selected from the group consisting of silicas, aluminas, and silica-aluminas. The crystalline ammonia transition metal molybdotungstate material of embodiment 1 wherein M is nickel or cobalt. The crystalline ammonia transition metal molybdotungstate material of embodiment 1 wherein M is nickel. The crystalline ammonia transition metal molybdotungstate material of embodiment 1 wherein the crystalline ammonia transition metal molybdotungstate material is sulfided.

Embodiment 2 is a method of making a crystalline ammonia transition metal molybdotungstate material having the formula:

$$(NH_4)_2 \cdot (NH_3)_a (H_2O)_{2-a} MMo_x W_y O_z$$

where 'M' is a metal selected from Mg, Mn, Fe, Co Ni, Cu, Zn and mixtures thereof; 'a' varies from 0 to 2; 'x' varies from 1.5 to 3, or from 1.5 to 2.5, or from 1.75 to 2.25; 'y' varies 0.01 to 0.5, or from 0.05 to 0.4, or from 0.1 to 0.3; the sum of (x+y) must be ≤3, or ≤2.5; z is a number which satisfies the sum of the valences of [(M+x+y)+2]; the material having a x-ray powder diffraction pattern showing peaks at the d-spacings listed in Table A:

TABLE A

| d (Å) | $I_0/I$ |
|---|---|
| 6.99 | m |
| 6.30 | w |
| 5.81 | vs |
| 5.36 | m |
| 5.05 | w |
| 4.79 | m |
| 4.43 | w |
| 4.10 | w |
| 3.95 | w |
| 3.79 | m |
| 3.69 | m |
| 3.50 | m | the method comprising: (a) forming a reaction mixture containing $NH_3$, $H_2O$, and sources of M, W, and Mo; (b) adjusting the pH of the reaction mixture to a pH of from about 8.5 to about 10; and (c) recovering the crystalline ammonia transition metal molybdotungstate material.

Embodiment 3 is a conversion process comprising contacting a feed with a catalyst at conversion conditions to give at least one product, the catalyst comprising the decomposition product of the decomposition by sulfidation of a crystalline ammonia transition metal molybdotungstate material having the formula:

$$(NH_4)_2 \cdot (NH_3)_a (H_2O)_{2-a} MMo_x W_y O_z$$

where 'M' is a metal selected from Mg, Mn, Fe, Co Ni, Cu, Zn and mixtures thereof; 'a' varies from 0 to 2; 'x' varies from 1.5 to 3, or from 1.5 to 2.5, or from 1.75 to 2.25; 'y' varies 0.01 to 0.5, or from 0.05 to 0.4, or from 0.1 to 0.3; the sum of (x+y) must be ≤3, or ≤2.5; z is a number which satisfies the sum of the valences of [(M+x+y)+2]; the material having a x-ray powder diffraction pattern showing peaks at the d-spacings listed in Table A:

TABLE A

| d (Å) | $I_0/I$ |
|---|---|
| 6.99 | m |
| 6.30 | w |
| 5.81 | vs |
| 5.36 | m |
| 5.05 | w |
| 4.79 | m |
| 4.43 | w |
| 4.10 | w |

TABLE A-continued

| d (Å) | $I_0/I$ |
|---|---|
| 3.95 | w |
| 3.79 | m |
| 3.69 | m |
| 3.50 | m |

The invention claimed is:

1. A conversion process comprising contacting a feed with a catalyst at conversion conditions to give at least one product, the catalyst comprising the decomposition product of the decomposition by sulfidation, at a temperature ranging from about 50° C. to about 600° C., of a crystalline ammonia transition metal molybdotungstate material having the formula:

$$(NH_4)_2 \cdot (NH_3)_a (H_2O)_{2-a} MMo_x W_y O_z$$

where 'M' is a metal selected from Mg, Mn, Fe, Co, Ni, Cu, Zn and combinations thereof; 'a' varies from 0 to 2; 'x' varies from 1.5 to 3; 'y' varies 0.01 to 0.5; the sum of (x+y) is ≤3; z is a number which satisfies the sum of the valences of [(M+x+y)+2]; the material having a x-ray powder diffraction pattern showing peaks at the d-spacings listed in Table A:

TABLE A

| d (Å) | $I_0/I$ |
|---|---|
| 6.99 | m |
| 6.30 | w |
| 5.81 | vs |
| 5.36 | m |
| 5.05 | w |
| 4.79 | m |
| 4.43 | w |
| 4.10 | w |
| 3.95 | w |
| 3.79 | m |
| 3.69 | m |
| 3.50 | m |

2. The process of claim 1 wherein the conversion process is hydroprocessing.

3. The process of claim 1 wherein the hydroprocessing process is selected from the group consisting of hydrodenitrification, hydrodesulfurization, hydrodemetallation, hydrodesilication, hydrodearomatization, hydroisomerization, hydrotreating, hydrofining, and hydrocracking.

4. The process of claim 1 wherein the crystalline ammonia transition metal molybdotungstate material is present in a mixture with at least one binder and wherein the mixture comprises up to 25 wt % binder.

5. The process of claim 4 wherein the binder is selected from the group consisting of silicas, aluminas, and silica-aluminas.

6. The process of claim 1 wherein the feed comprises sulfur and the decomposition by sulfidation comprises contacting the crystalline ammonia transition metal molybdotungstate material with the sulfur containing feed.

7. The process of claim 1 wherein the decomposition by sulfidation comprises contacting the crystalline ammonia transition metal molybdotungstate material with a gaseous mixture of $H_2S/H_2$.

8. The process of claim 1 wherein the sulfidation is conducted at a temperature ranging from about 150° C. to about 500° C.

9. The process of claim 1 wherein the sulfidation is conducted at a temperature ranging from about 250° C. to about 450° C.

10. A method of making a catalyst comprising the decomposition product of the decomposition by sulfidation of a crystalline ammonia transition metal molybdotungstate material having the formula:

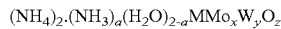

$$(NH_4)_2 \cdot (NH_3)_a (H_2O)_{2-a} MMo_x W_y O_z$$

where 'M' is a metal selected from Mg, Mn, Fe, Co Ni, Cu, Zn and mixtures thereof; 'a' varies from 0 to 2; 'x' varies from 1.5 to 3; 'y' varies 0.01 to 0.5; the sum of (x+y) is ≤3; z is a number which satisfies the sum of the valences of [(M+x+y)+2]; the material having a x-ray powder diffraction pattern showing peaks at the d-spacings listed in Table A:

TABLE A

| d (Å) | $I_0/I$ |
|---|---|
| 6.99 | m |
| 6.30 | w |
| 5.81 | vs |
| 5.36 | m |
| 5.05 | w |
| 4.79 | m |
| 4.43 | w |
| 4.10 | w |
| 3.95 | w |
| 3.79 | m |

TABLE A-continued

| d (Å) | $I_0/I$ |
|---|---|
| 3.69 | m |
| 3.50 | m | the method comprising:
 (a) forming a reaction mixture containing $NH_3$, $H_2O$, and sources of M, W, and Mo;
 (b) adjusting the pH of the reaction mixture to a pH of from about 8 to about 10;
 (c) recovering the crystalline ammonia transition metal molybdotungstate material; and
 (d) decomposing the recovered crystalline ammonia transition metal molybdotungstate material by sulfidation to generate at least one decomposition product.

11. The method of claim 10 wherein the recovering is by filtration or centrifugation or evaporation of solvent.

12. The method of claim 10 further comprising adding a binder to the recovered crystalline ammonia transition metal molybdotungstate material.

13. The method of claim 12 wherein the binder is selected from the group consisting of aluminas, silicas, and alumina-silicas.

14. The method of claim 10 further comprising adding at least one binder to the crystalline ammonia transition metal molybdotungstate material wherein the combination of material and binder comprises up to 25 wt % binder.

* * * * *